S. Cook.
Smut Mill.

N° 9,682.   Patented Apr. 26, 1853.

UNITED STATES PATENT OFFICE.

SAML. COOK, OF BROCKPORT, NEW YORK.

SMUT-MACHINE.

Specification of Letters Patent No. 9,682, dated April 26, 1853.

*To all whom it may concern:*

Be it known that I, SAMUEL COOK, of Brockport, in the county of Monroe and State of New York, have invented certain new and useful Improvements in Machines for Screening and Smutting Wheat, &c.; and I do hereby declare the following to be a full, clear, and exact description of the same, reference being had to the accompanying drawings, making a part thereof, in which—

Figure 1:
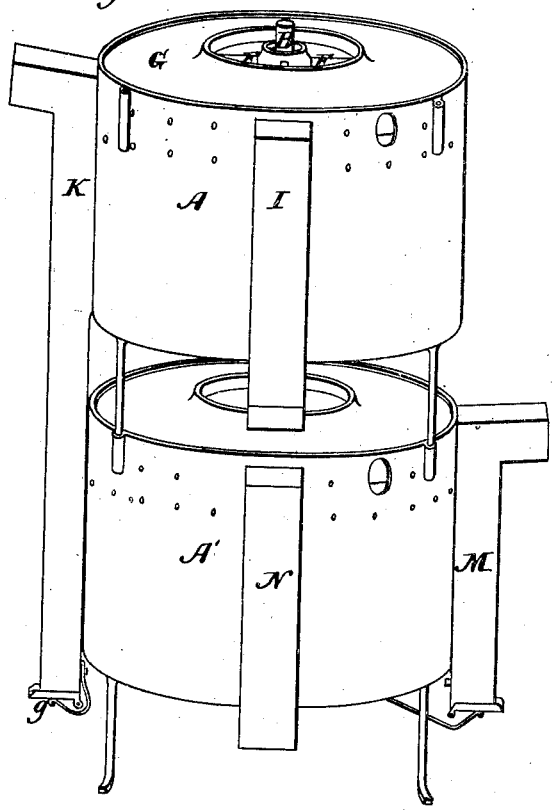
Figure 2:
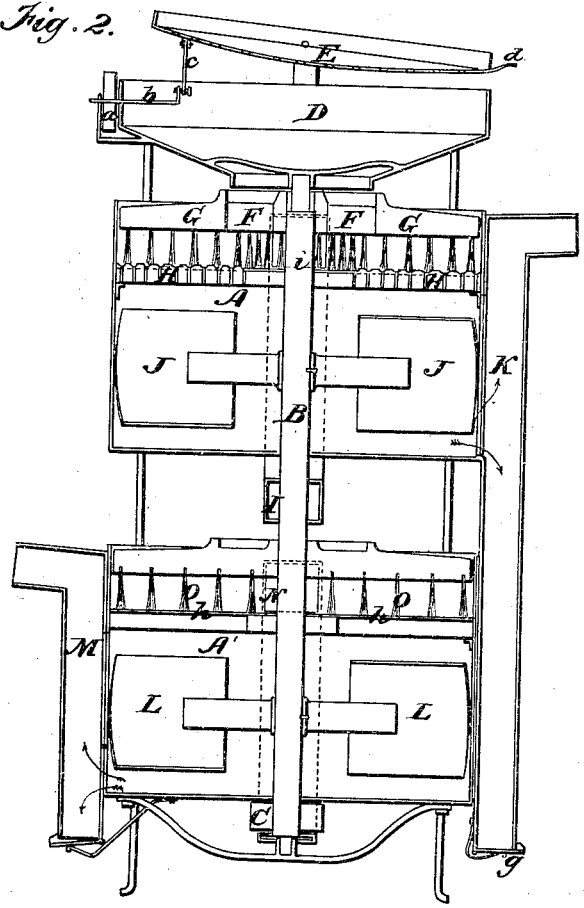
Figure 3:
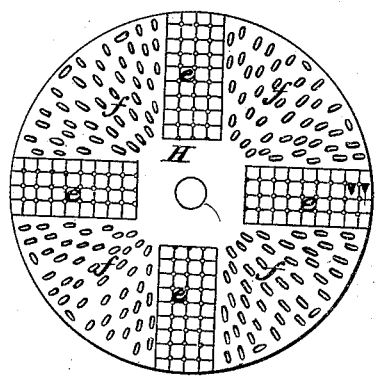

Figure 1, represents a perspective view of the machine; Fig. 2, represents a vertical section through the center of the machine, and Fig. 3, a top view of the upper screening plate.

Similar letters in the several figures denote the same parts.

The nature of my invention consists in providing the cylinder and screening and scouring plates with holes through which a draft of air, is drawn into the machine by a fan blower, which passes through said holes and brush, and so that while the brush wheel is agitating the wheat or other grain on the plates, the draft through said plates will carry off all the finer particles, separating the full wheat from the shrunken, and both from the smaller seeds such as cockle, chess, grass, &c., and by the same operation divest and separate the wheat from smut and other impurities.

To enable others skilled in the art to make and use my invention, I will proceed to describe the same with reference to the drawings.

A, A′, represent two cylinders placed one over the other, having a common shaft B, passing through their centers, which may be provided with a pulley C, at the bottom for giving it motion. Over the top cylinder A, is placed a hopper D, and over the hopper a vibrating or oscillating screen E, is hinged or hung, which may be operated by means of a belt from any first moving power, passing over a pulley $a$, on a crank shaft $b$ which is attached by a connecting rod $c$, to said screen E. The grain is thrown into the screen E, and by its motion, the white caps, chaff and other similar light material passes off over the lip $d$, of the screen, while the grains pass through into the hopper D, and thence through holes F, in the head or stock G, of the brush, which closes up the top of the cylinder. The brush is formed of bristles, whalebone or steel-wire in part or in whole, and turns with the shaft B, on which it is fastened, so as to work or rub upon a stationary screening plate H, made partially of cast plates or pieces $e$, roughened and pierced with fine holes, and of sheet metal pieces $f$, with larger holes through which the smaller grains may pass—the full wheat passing through the tube I, to the lower cylinder to be scoured and smutted as will be hereafter described. While the grains &c. are being passed or brushed over the plate H, a draft or blast of air is drawn in at the top of the cylinder by means of the fan J, below said plate, and passes through the brush, and the holes in said plate H, and thus assists (by its draft) the brushes in passing the cockle &c. through and separating it from the full wheat. When the lighter material is passed through the plate H, the fan J, throws it out through the pipe K, through the opening shown by the red arrows Fig. 2, the lightest passing out of the end or open top of said pipe, and the light wheat and grass seeds, by their gravity falling into the bottom of said pipe, where a spring door $g$, is arranged, which, whenever a sufficient weight of grain, accumulates upon it, will open and allow it to pass out, and again close by its spring to prevent any air from being drawn into the machine through said pipe. The full grain as above stated, passes from the plate H, through the pipe I the entrance to the pipe being shown in dotted lines (Fig. 2, $i\ i$) and is fed into the lower scouring and smutting cylinder A′, through holes in the stock of the lower brush O, and is scoured and divested of the smut by being brushed around against the roughened surface of the lower plate $h$, which is perforated with small holes, through which the air is drawn by the fan L, placed in the lower part of said cylinder A′, the air being drawn in at top, and passing through the holes in said brush and plate $h$, for this purpose. The smut is thrown off by the fan L, through the pipe M, the opening of which may be seen at the dark arrows Fig. 2, which should extend to the outside of the building, while any other material which may have possibly passed through the plate $h$, and by its specific gravity would not be carried out by the blast, would drop down to the bottom of said pipe and escape by opening a spring door in its bottom, as in the case of the pipe K above described. The full wheat passes out of the machine through the pipe N. Thus by one machine, I prepare wheat for the stones, by first screening and then scouring and smutting and separating the shrunken from the full wheat which heretofore has ordinarily required two or more operations, I likewise save everything that is valuable in the wheat as it is brought to market, while I entirely divest it of all extraneous or injurious matter.

Having thus fully described the nature of my invention what I claim therein as new and desire to secure by Letters Patent is—

The construction, combination and operation of the fan, screening plate and brush in the cylinder and the openings and tubes or pipes leading therefrom—when the fan is placed below and the brush above said plate, so that the blast created by the fan, shall be drawn through the plate, and also when said cylinder is provided with discharge openings and tubes, for conveying off the full wheat—the lighter grains—and the dust in separate directions substantially as described: and this claim whether the same be effected in a single cylinder or in two or more, so long as they are the same substantially in construction and operation.

SAMUEL COOK.

Witnesses:
A. B. STOUGHTON,
S. C. DONER.